(12) United States Patent
Biskeborn

(10) Patent No.: US 7,978,429 B2
(45) Date of Patent: Jul. 12, 2011

(54) LOW TRACK PITCH WRITE MODULE AND BIDIRECTIONAL TAPE HEAD

(75) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 11/532,970

(22) Filed: Sep. 19, 2006

(65) Prior Publication Data

US 2008/0068751 A1    Mar. 20, 2008

(51) Int. Cl.
*G11B 5/29* (2006.01)

(52) U.S. Cl. ..................................... 360/121; 360/241.1
(58) Field of Classification Search .................. 360/129, 360/121, 241, 241.1
See application file for complete search history.

(56) References Cited

U.S. PATENT DOCUMENTS

| | | | |
|---|---|---|---|
| 3,662,119 A | 5/1972 | Romankiw et al. | |
| 4,376,337 A | 3/1983 | Kobayasi et al. | |
| 4,405,960 A | 9/1983 | Pick et al. | |
| 5,121,270 A | 6/1992 | Alcudia et al. | |
| 5,189,572 A | 2/1993 | Gooch | |
| 5,208,714 A | 5/1993 | Denison et al. | |
| 5,220,473 A | 6/1993 | Brock et al. | |
| 5,237,476 A * | 8/1993 | Bischoff et al. | 360/123.1 |
| 5,375,023 A | 12/1994 | Ju et al. | |
| 5,483,394 A | 1/1996 | Harman | |
| 5,574,602 A | 11/1996 | Baca et al. | |
| 5,621,594 A | 4/1997 | Gray et al. | |
| 5,737,156 A | 4/1998 | Bonyhard | |
| 5,831,798 A * | 11/1998 | Muller et al. | 360/121 |
| 5,862,014 A | 1/1999 | Nute | |
| 5,917,671 A * | 6/1999 | Kaaden et al. | 360/77.12 |
| 5,969,912 A | 10/1999 | Cope | |
| 6,141,174 A | 10/2000 | Judge et al. | |
| 6,430,008 B1 * | 8/2002 | Trabert et al. | 360/317 |
| 6,456,460 B1 | 9/2002 | Connelly et al. | |
| 6,570,738 B1 * | 5/2003 | McKinstry | 360/121 |

(Continued)

FOREIGN PATENT DOCUMENTS

EP    1107236 A1 *   6/2001

(Continued)

OTHER PUBLICATIONS

Fan et al., Compact Horizontal Head Structure for Arrays, May 1, 1993, IBM Technical Disclosure Bulletin, v36 n5 May 1993, p. 377-378.*

(Continued)

*Primary Examiner* — Craig A. Renner
*Assistant Examiner* — Carlos E Garcia
(74) *Attorney, Agent, or Firm* — Walter W. Duft

(57) ABSTRACT

A low track pitch write module and bidirectional tape head for writing and/or reading data on a magnetic recording tape. The write module and tape head have a tape bearing surface for engaging the magnetic recording tape and plural write elements. The write elements are arranged so that the write gaps of adjacent write elements are spaced from each other by not more than approximately one write gap width, while being generally aligned along an axis that is perpendicular to a direction of movement of the magnetic recording tape. The write elements may have a planar or vertical construction comprising plural thin film layers oriented in generally parallel or perpendicular relationship with the tape bearing surface. One or more read element arrays may also be provided.

9 Claims, 13 Drawing Sheets

U.S. PATENT DOCUMENTS

| | | |
|---|---|---|
| 6,690,542 B1 | 2/2004 | Wang |
| 7,130,152 B1 * | 10/2006 | Raymond et al. ............. 360/121 |
| 2002/0034042 A1 | 3/2002 | Hungerford et al. |
| 2003/0011922 A1 | 1/2003 | Nozieres et al. |
| 2003/0017369 A1 * | 1/2003 | Hirayama et al. ..... 428/694 TM |
| 2003/0039070 A1 | 2/2003 | Biskeborn et al. |
| 2003/0189774 A1 * | 10/2003 | Hamaguchi et al. ............ 360/13 |
| 2004/0060163 A1 | 4/2004 | Biskeborn et al. |
| 2005/0007700 A1 * | 1/2005 | Nagai ........................ 360/241.1 |
| 2005/0013042 A1 * | 1/2005 | Rubas et al. .................. 360/121 |
| 2005/0018349 A1 * | 1/2005 | Eaton ........................... 360/129 |
| 2006/0187578 A1 * | 8/2006 | Hamaguchi et al. ....... 360/97.01 |

FOREIGN PATENT DOCUMENTS

EP          1381031  A1 *   1/2004

OTHER PUBLICATIONS

"Thin Film and Thin Film Ferrite Hybrid Magnetic Head," IBM Technical Disclosure Bulletin, Jun. 1975, pp. 19-22.

* cited by examiner

LOW TRACK PITCH WRITE MODULE AND BIDIRECTIONAL TAPE HEAD

BACKGROUND OF THE INVENTION

1. Field of the Invention

This invention relates to tape drive data storage systems. More particularly, the invention is directed to thin film tape heads for reading and writing data on magnetic recording tape.

2. Description of the Prior Art

Thin film tape heads for magnetic information storage systems (e.g., tape drives) have been constructed using the same fabrication techniques used by disk drive manufacturers. A characteristic of such construction is that the thin film layers which comprise the read and write transducer elements are oriented perpendicularly to the tape bearing surface (TBS) of the head. Such heads may be referred to as "vertical" heads due to the fact that the read and write gap portions are situated at the TBS, while the element layer structures extend vertically away from the TBS. In a vertical head with multi-track recording capability, plural transducer elements are commonly arranged side-by-side to form a linear transducer array that is transverse to the direction of tape movement. Each transducer element in the array is positioned to write or read a separate longitudinal track on the tape. This arrangement is shown in FIG. 1, which depicts a vertical head "H" having an array of thin film transducer elements "E" whose gaps "G" engage a tape "T" along tracks "TR" in the direction of tape movement "D." FIG. 2 illustrates an exemplary internal construction of the vertical head "H" in which the transducers comprise alternating read and write elements "R" and "W." As shown in FIG. 3, the vertical head "H" of FIG. 2 can be secured to a mounting block "MB" in association with a complimentary vertical head "H'" whose read and write elements are in reverse order. The resultant head assembly will have read/write element pairs that are aligned in the trackwise direction of the tape "T." This arrangement provides conventional read-after-write capability in which data written to the tape "T" is immediately read back and checked for errors. Read-after-write capability may also be achieved with a single vertical head having pairs of trackwise-aligned read and write elements that are constructed according to the well-known "piggyback" arrangement used in disk drives. Other conventional vertical head designs include heads in which all of the transducer elements "E" are either read elements or write elements. Read-after-write capability may then be achieved by bonding a read-only head to a write-only head to provide trackwise-aligned read and write element pairs.

A disadvantage of vertical head constructions as described above is that the transducer element gaps at the TBS must be sufficiently spaced from each other to provide room for the major portion of the transducer element structure that is recessed behind the TBS. For a write element, the recessed structure includes the pole pieces and the coil windings, which (as can be seen in FIG. 2) are quite bulky as compared to the write gap structure at the TBS. For a read element, the recessed structure includes the electrical leads and magnetic hard biasing elements (if present). These are also relatively bulky compared to the read gap structure at the TBS, although less so compared to write elements. The foregoing spacing requirements render the transducer array of a vertical head much wider than it needs to be for the number of tracks being read or written at any given moment. The problem is that the gap pitch within the transducer array is much larger than the gap width, such that for every track being read or written by the array, there will be space between the tracks where no transducing occurs. This "comb" effect can be seen in FIG. 2, which shows that for every pair of tracks "TR" aligned with adjacent read and write elements "R" and "W," there is inter-track white space on the tape "T" that is not tranduced.

The comb effect can be solved by stepping the head in a cross-track direction during multiple transducing passes, such that the inter-track white space is ultimately recorded with data after some number of passes have been made. Tape tracks can also be written at less than the gap width of the write transducers using a process known as "shingling." According to this technique, the head is stepped by less than the write element gap width for each successive transducing pass, such that the edge of a previously written track is overwritten during the next pass, much like shingles on a roof.

Although the foregoing track writing techniques allow data to be densely packed on a tape, a continuing unresolved problem is track misregistration caused by tape dimensional changes between writing and reading operations. For example, a tape may be written with data under one set of temperature and humidity conditions, and then later read following exposure to different environmental conditions. For conventional tape material, the dimensions can change by as much as 0.12%. These tape dimensional changes will widen or narrow the tape track spacing geometry, resulting in track misregistration with the tape head whose gap spacing geometry is substantially unchanged. Although rotation of the tape head can be used to address the misregistration problem by changing the effective track pitch of the transducer array, this solution requires sophisticated mechanics and skew compensation circuitry.

To illustrate the misregistration problem, assume the transducer array spans x µm between the outermost elements, and the percentage change in tape dimension is 0.12%. The resultant change in the spacing of the tape tracks under the outermost elements will be 0.0012x µm. On the other hand, if the transducer array spans 0.5x µm, then a 0.12% change in tape dimension will only change the tape track spacing under the outermost elements by 0.0006x µm. The 0.5x transducer array span will thus experience only half of the tape dimensional change that is experienced by the x transducer span, such that track misregistration is less likely. Note that if the head gap pitch can be reduced to a value which approaches the gap width, a further advantage of being able to perform contiguous-track bundle writing could be achieved. The head would then be able to read and write the entire tape area underlying the transducer array in a single pass, thereby alleviating the precise tracking required for shingling tracks in multiple passes.

Accordingly, it is desired to have an improved design for a thin film tape head for reading and writing data on magnetic recording tape. What is particularly needed is a head design that provides the ability to reduce the gap pitch of read and write elements, especially to levels approaching the gap width.

SUMMARY OF THE INVENTION

The foregoing problems are solved and an advance in the art is obtained by a low track pitch write module and bidirectional tape head for writing and optionally reading data on a magnetic recording tape. The write module and tape head have a tape bearing surface for engaging the magnetic recording tape and plural write elements. Each of the write elements comprises first and second pole pieces having respective pole tips that are spaced from each other at the tape bearing surface to form a write gap. The write elements further include back gap regions where the poles pieces are magnetically connected to each other. The write elements are arranged so that the write gaps of adjacent write elements are spaced from each other by not more than approximately one gap width, while being generally aligned along an axis that is perpendicular to a direction of movement of the magnetic recording tape.

According to one exemplary embodiment, write elements in the write module each comprise plural thin film layers oriented in generally parallel planar relationship with the write module tape bearing surface. The write elements may comprise a pancake coil construction or a helical coil construction. In both cases, the write elements may comprise a pair of pole tips providing a write gap at the write module tape bearing surface and a pair of pole pieces extending from the pole tips to a back gap region where the pole pieces are joined, with the back gap region being spaced in a trackwise direction from the write gap. The write elements may be arranged so that adjacent write elements have adjacent pole tips but oppositely extending pole pieces and back gaps. This allows the write elements to be arranged with spaced write gaps or with near contiguous write gaps in order to bundle write contiguous tracks on the magnetic recording medium.

According to another embodiment, the write elements have a vertical construction comprising plural thin film layers oriented in generally perpendicular relationship with the tape bearing surface. The write elements may be constructed with a helical coil configuration in which a helical coil wraps around one of the vertical pole pieces. To facilitate near contiguous spacing of the write gaps, portions of adjacent write elements may be arranged in alternating layers.

Read-after-write capability may be provided by mounting one or more separate read modules in a fixed relationship relative to a write module that comprises the write elements. If vertical write elements are used, one or more read element arrays having a vertical construction may be fabricated on a common substrate with the write elements. Adjacent read elements may be disposed in alternating vertical layers to reduce read gap spacing requirements.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 1:
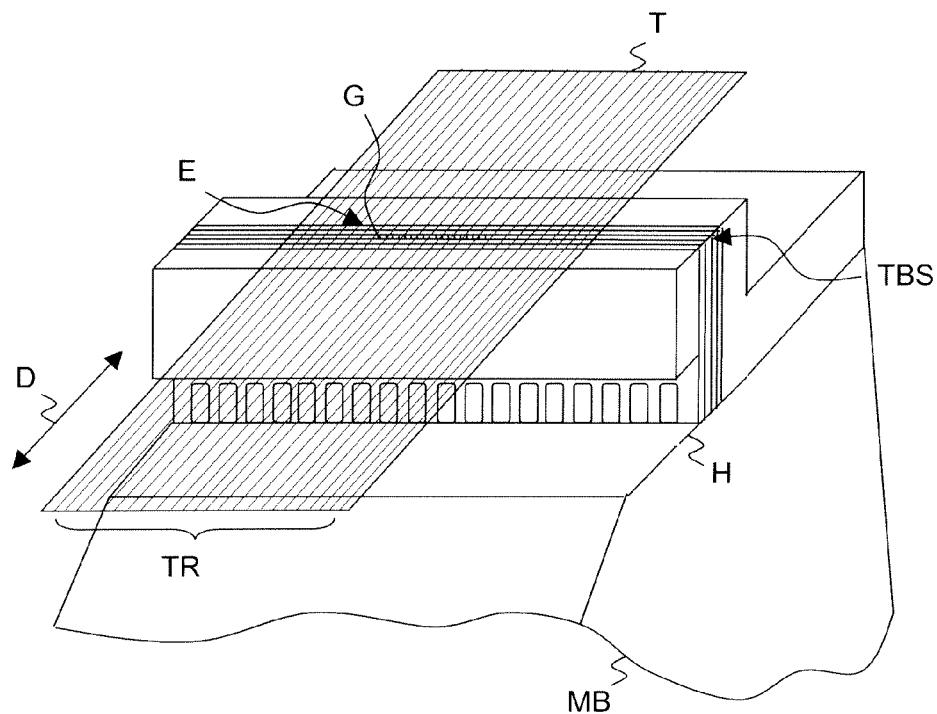
FIG. 1 is a perspective view showing a prior art thin film vertical tape head.
Figure 2:
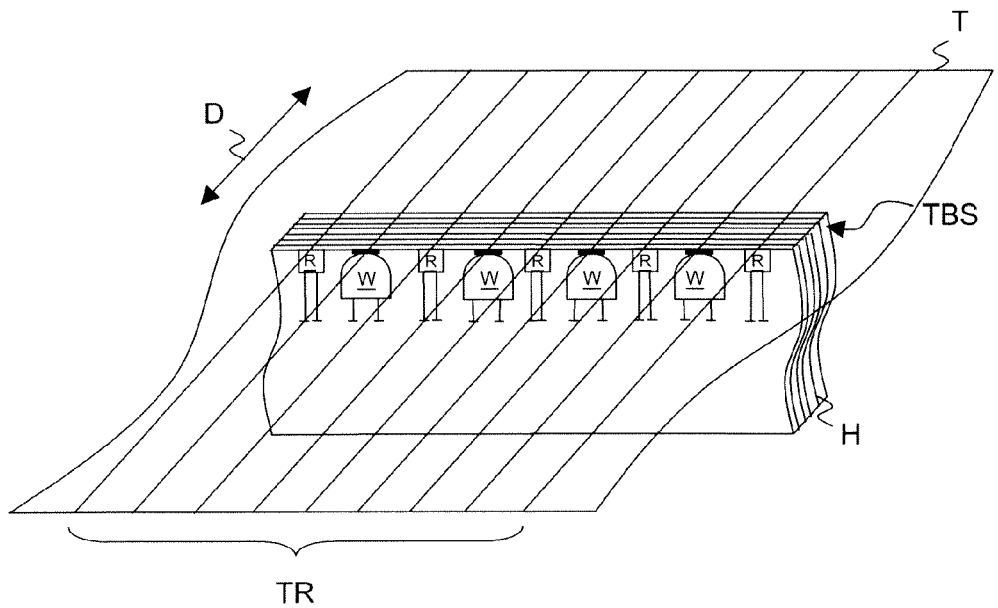
FIG. 2 is a perspective view showing an exemplary construction of the prior art tape head of FIG. 1.
Figure 3:
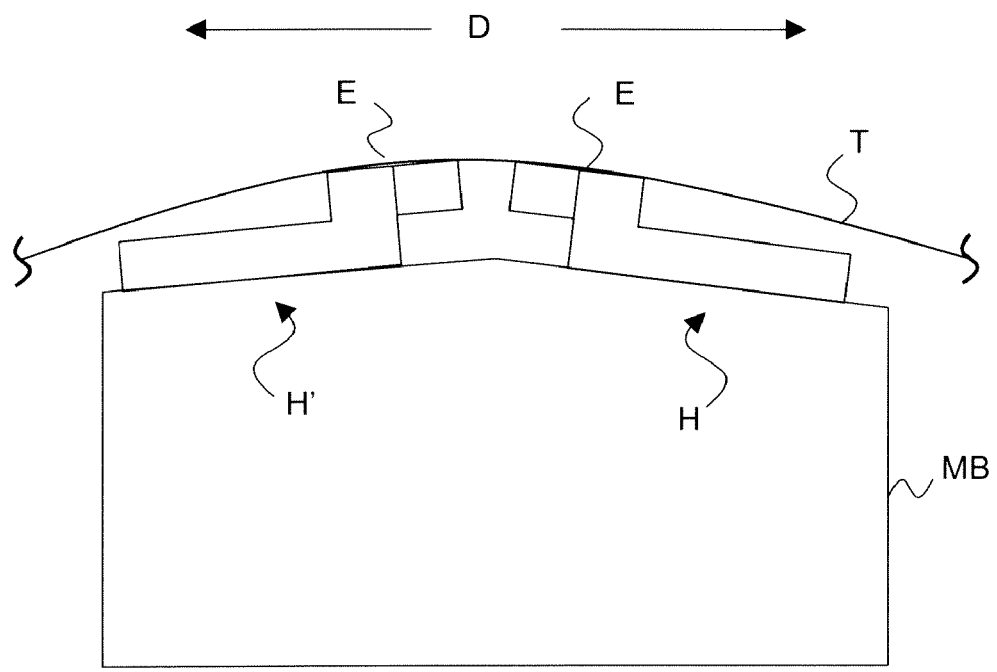
FIG. 3 is a side elevation view showing a pair of the vertical tape heads of FIG. 1 secured to a mounting block.

The invention will now be described by way of exemplary embodiments shown by the drawing figures (which are not necessarily to scale), in which like reference numerals indicate like elements in all of the several views.

Figure 4:
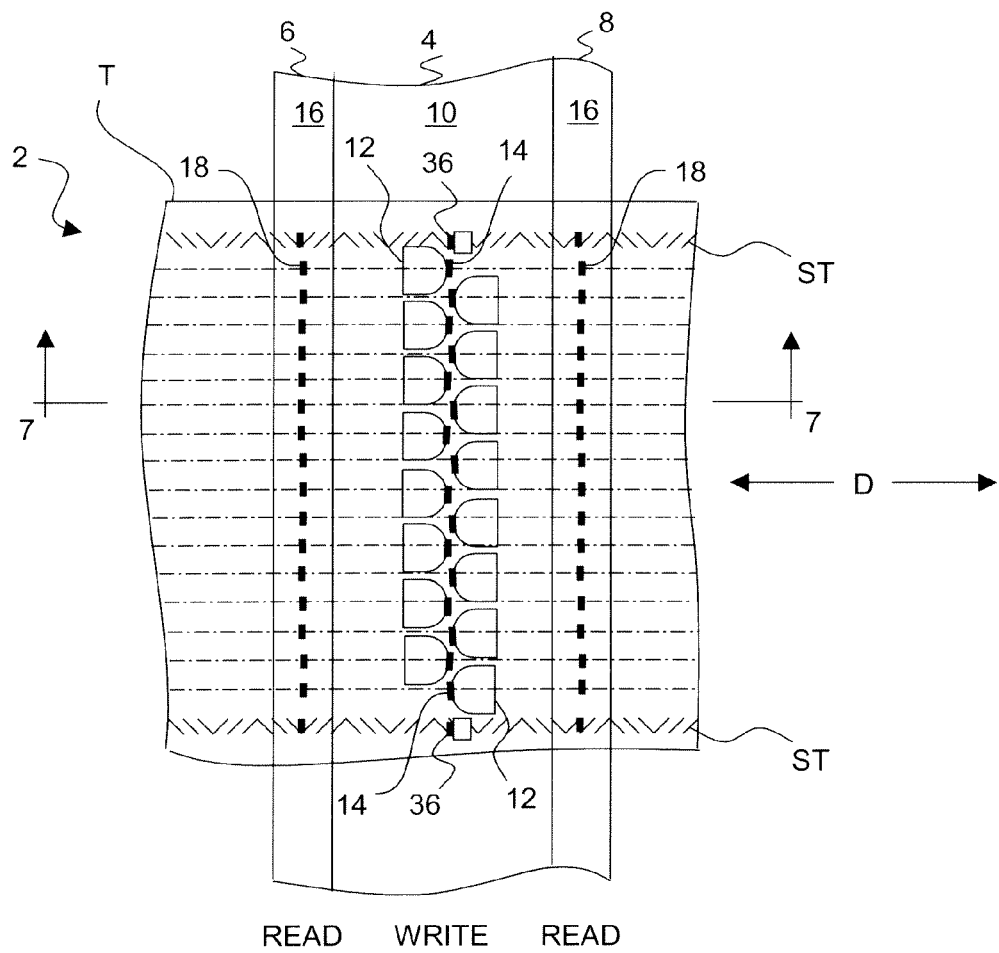
FIG. 4 is a partial plan view showing a tape bearing surface of an exemplary hybrid tape head, with a segment of magnetic recording tape superimposed over the tape head.

Turning now to FIG. 4, a tape head 2 includes a planar write module 4 that may be used alone or optionally arranged with one or both of a pair of vertical read modules 6 and 8. The write module 4 has a write module tape bearing surface 10 for engaging a magnetic recording tape "T," one edge of which is shown in FIG. 4. As additionally shown in FIGS. 5-7, the write module 4 has a planar head construction in which plural write elements 12 in the write module 4 each comprise plural thin film layers "L" oriented in generally parallel planar relationship with the write module tape bearing surface 10. It will be seen that the write elements 12 are arranged so that the transducing gaps (write gaps) 14 of adjacent write elements are generally aligned along an axis "A-A" that is perpendicular to a streaming direction of the magnetic recording tape (shown by the arrow "D" in FIG. 4).

Figure 7:
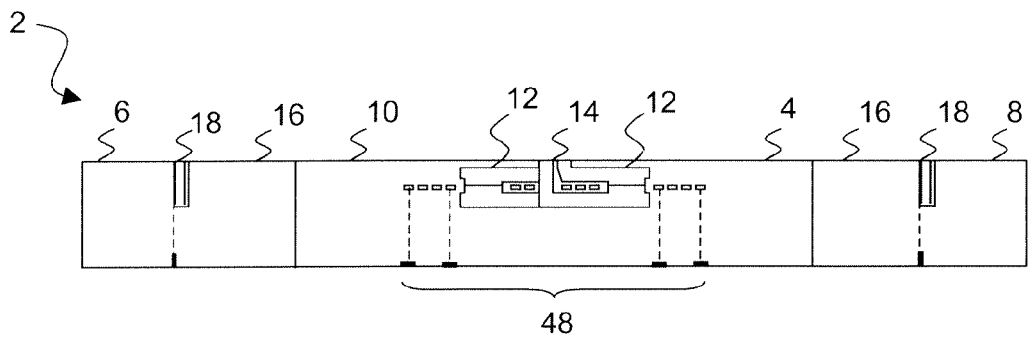
FIG. 7 is a head cross-sectional view taken along line 7-7 in FIG. 4.

Each of the optional read modules 6 and 8 has a read module tape bearing surface 16 for engaging the magnetic recording tape "T." As additionally shown in FIG. 7, the read modules 6 and 8 have a conventional vertical head construction in which plural read elements 18 each comprise plural thin film layers oriented in generally perpendicular relationship with the read module tape bearing surface 16. Although not shown, adjacent read elements 18 may be formed in different layers of the read modules 6 and 8 to reduce read gap spacing requirements. Although the read modules 6 and 8 are shown in FIGS. 4 and 7 as being contiguous with the write module 4, one or both of the read modules could be spaced from the write module in a fixed relationship therewith.

Figure 5:
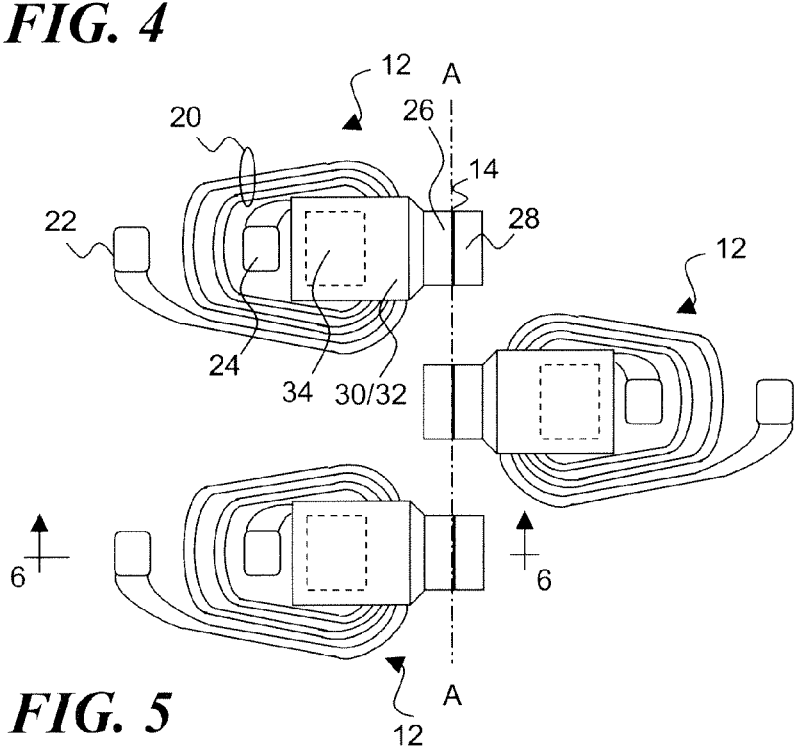
FIG. 5 is an enlarged plan view showing a portion of a write module of the tape head of FIG. 4.
Figure 6:
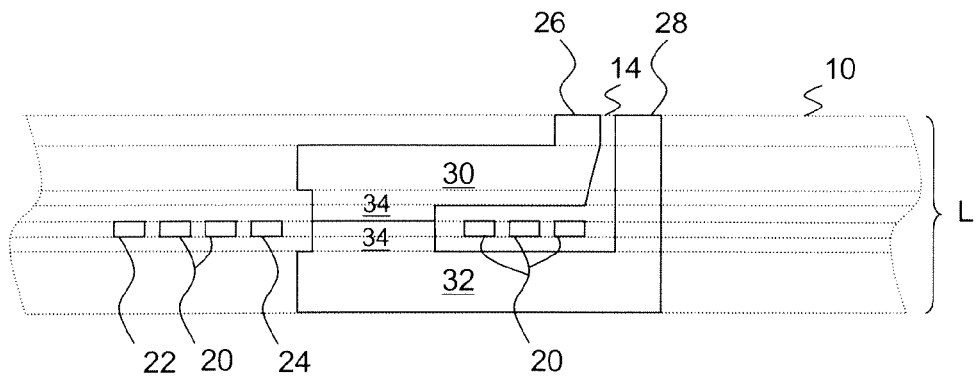
FIG. 6 is write element cross-sectional view taken along line 6-6 in FIG. 5.

In the exemplary embodiment represented by FIGS. 4-7, the write elements 12 comprise a pancake coil construction. According to this construction, the write coil 20 is constructed with plural coil windings in a single one of the thin film layers "L," as can be seen in FIG. 6. A pair of contact pads 22 and 24 are provided for connecting the write coil 20 to an information-modulated current source (not shown). The write elements 12 further comprise a pair of pole tips 26 and 28 that provide the write gap 14 at the write module tape bearing surface 10. A pair of pole pieces 30 and 32 respectively extend from the pole tips 26 and 28 to a back gap region 34 where the pole pieces are joined. The pole tips 26/28 and the pole pieces 30 and 32 can be formed from any suitable magnetically permeable material of the type conventionally used to fabricate inductive write heads for information storage. As can be seen in FIG. 6, the pole pieces 30 and 32 initially extend from the pole tips 26 and 28 in a direction that is generally perpendicular to the write module tape bearing surface 10. Each pole piece 30 and 32 then makes an approximate 90° bend at a separate one of the layers "L" of the write module 4, and thereafter extends generally parallel to the write module tape bearing surface 10 to the back gap region 34. The back gap region 34 is thereby spaced in a trackwise (i.e., along the track) direction from the write gap 14.

It will be seen in FIGS. 5 and 6 that the write coil 20 wraps around the back gap region 34 with the coil windings on one side of the back gap region being disposed between the pole pieces 30 and 33. When the write coil 20 is energized, it will induce magnetic flux in the pole pieces 30 and 32 so as to produce a magnetic field at the pole tips 26 and 28 that propagates across the write gap 14. It will be appreciated that the strength of the magnetic field at the write gap 14 depends in part on the number of windings of the write coil 20. Although not shown, one way to increase the number of coil windings without increasing the overall size of the write elements (when viewed in the plan view orientation of FIG. 5) would be to form the additional windings on one or more separate layers "L" of the write module 4.

As additionally shown in FIGS. 5 and 6, the write elements 12 are arranged so that adjacent write elements have adjacent pole tips 26/28 but oppositely extending pole pieces 30/32 and back gaps 34. Depending on the size of the write coil 20, the write elements 12 may be arranged with spaced write gaps (as shown in FIG. 5) that are spaced by a desired separation distance (preferably not more than approximately one gap width), or with near contiguous write gaps (not shown) having a nominal spacing that is substantially less than one gap width in order to bundle write on contiguous tracks of the magnetic recording medium. In the first instance, the gap pitch (i.e., the distance between the centerlines of adjacent write gaps) will be approximately 2 gap widths. In the second instance, the gap pitch will approximate the gap width. By way of example, a gap separation corresponding to the width of the write element erase band could be used. The gap pitch in that case will be the sum of the gap width and the erase band width. Typically, the erase band width is approximately 3-5 times the gap size (i.e., the separation between the pole pieces 30/32 in the direction of tape movement). Assuming a typical gap size of approximately 5 microns, the gap spacing (if equal to the erase band width), would be approximately 15-25 microns. Note that the size of the write coil 20 will depend in large part on the number of coil windings formed in any given layer "L" of the write module 4, which can be controlled by using plural layers as discussed above.

Figure 8:
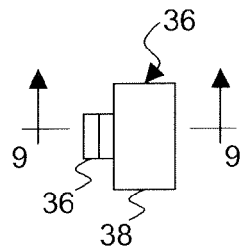
FIG. 8 is a plan view showing a write module servo reader.
Figures 9, 10:
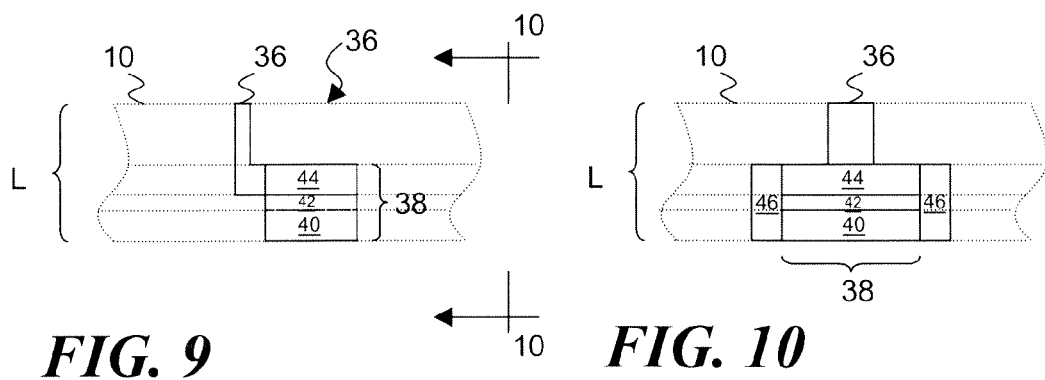
FIG. 9 is a cross-sectional view taken along line 9-9 in FIG. 8.
FIG. 10 is a side view taken in the direction of the arrows 10-10 in FIG. 9.

As shown in FIG. 4, the tape head 2 includes servo read elements for reading conventional timing-based servo tracks "ST" on the tape "T." The servo read elements may be provided by additional read elements 18 on the read modules 6 and 8, or they may be provided by planar servo read elements 36 on the write module 4. As shown in FIGS. 8-10, each planar servo read element 36 comprises a sensor structure 38 formed in plural thin film layers "L" of the write module 4 that are oriented in parallel planar relationship with the write module tape bearing surface 10. As persons skilled in the art will appreciate, the sensor structure layers may include a magnetic pinned layer 40, a spacer layer 42 and a magnetic free layer 44. A pair of electrode/hard biasing structures 46 may be provided on each side of the sensor structure to provide a CIP (Current-In-Plane) sensor. Although not shown, a CPP (Current-Perpendicular to-Plane) sensor could also be used. A conventional flux guide is used to carry magnetic flux from the write module tape bearing surface 10 to the free layer 44.

FIG. 7 shows the tape head 2 when viewed from the edge of the tape "T" of FIG. 4. As can be seen, electrical connections are made to the write elements 12 from electrical contact pads 48 formed on the surface of the tape head 2 which is opposite from the tape bearing surface 10. Electrical cables (not shown) may be attached to the contact pads 48 using conventional techniques. Electrical connections to the reader elements 18 can be provided using conventional contact pads of the type shown in FIG. 1, as are commonly used for vertical read elements. Although not shown, it would be possible to fabricate driver components, such as FETs (Field Effect Transistors), above the contact pads 48 of the write module 4. Alternatively, the drivers may be fabricated on separate chips, which are then mounted close to the tape head 2. The tape bearing surfaces 10 and 16 of the tape head 2 may be lapped to define a preferred tape wrap angle as the tape "T" streams over the head.

Figure 11:
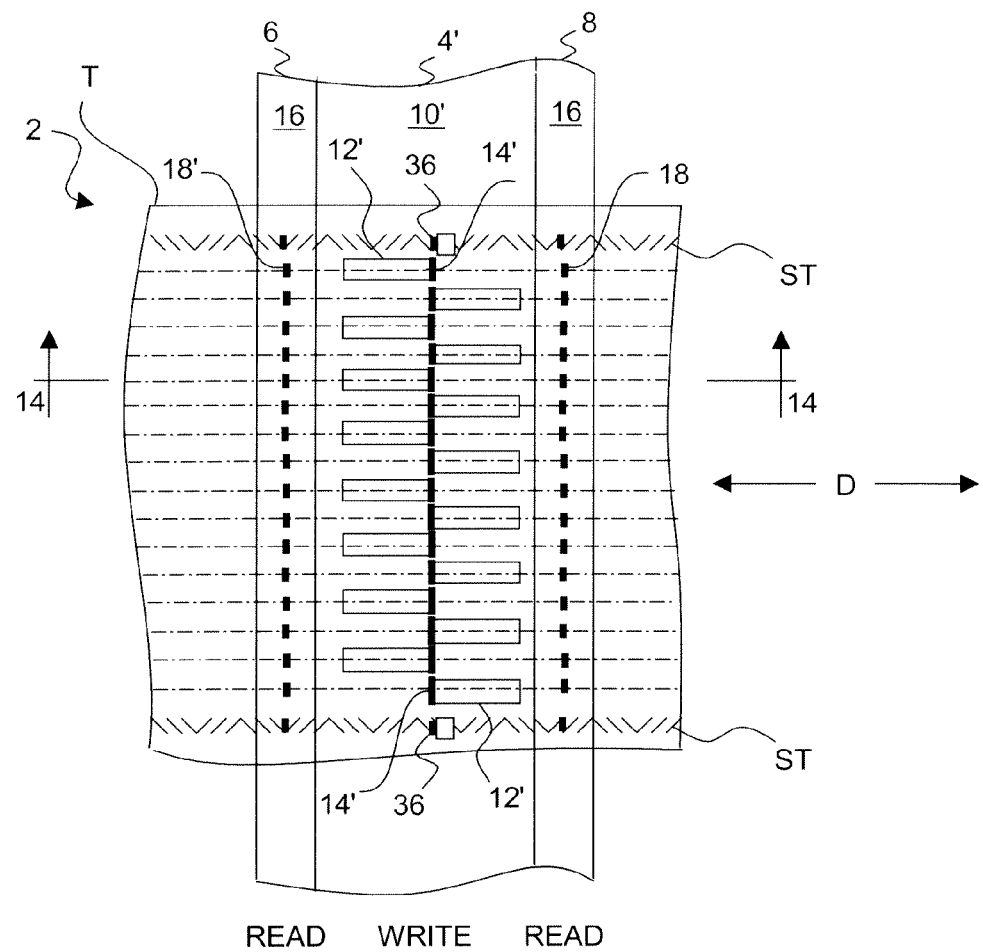
FIG. 11 is a partial plan view showing a tape bearing surface of another exemplary tape head, with a segment of magnetic recording tape superimposed over the tape head.
Figure 12:
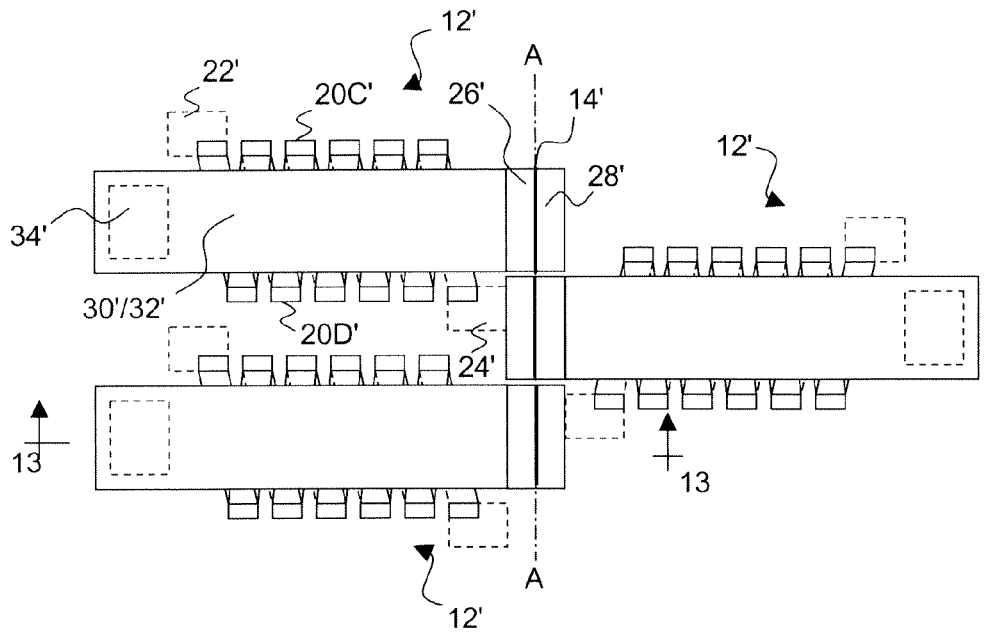
FIG. 12 is an enlarged plan view showing a portion of a write module of the tape head of FIG. 11.
Figure 13:
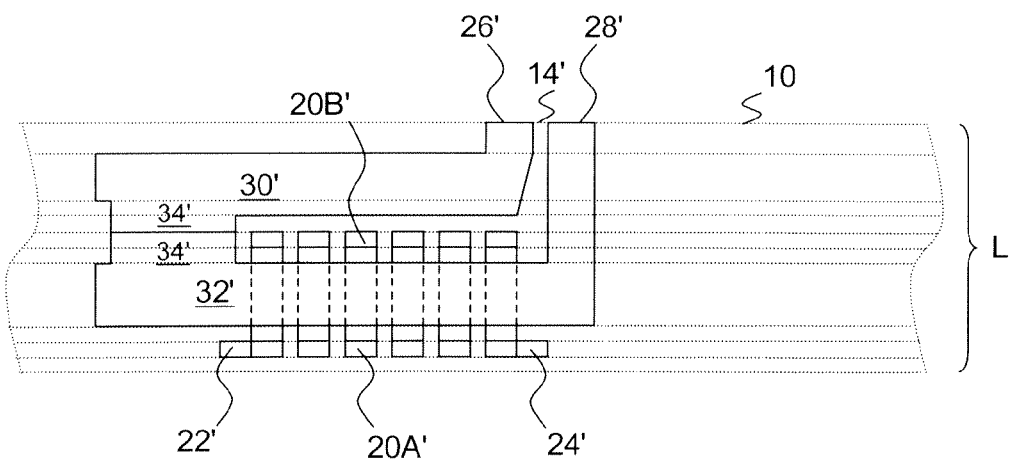
FIG. 13 is write element cross-sectional view taken along line 13-13 in FIG. 12.
Figure 14:
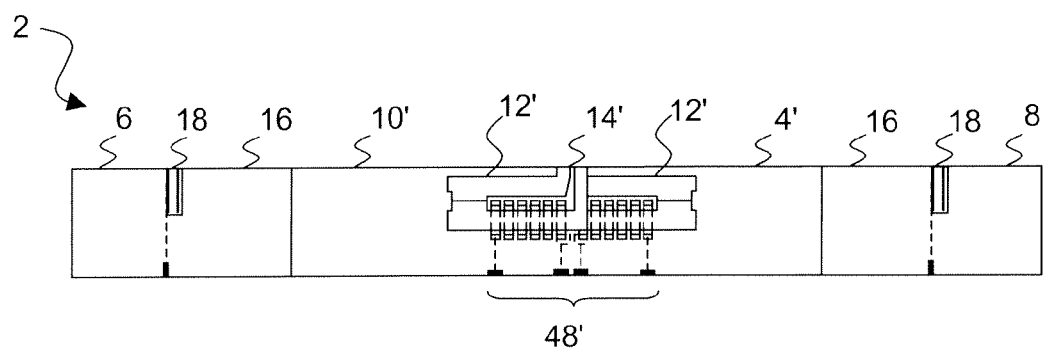
FIG. 14 is a head cross-sectional view taken along line 14-14 in FIG. 11.

Turning now to FIGS. 11-14, an alternative write module 4' is shown for use in the tape head 2 in which the write elements 12' comprise a helical coil construction. According to this construction, the write coil 20' is constructed with plural coil windings in plural film layers "L," as can be seen in FIG. 13. In particular, a first set of coil winding elements 20A' is formed in a first one of the layers "L," a second set of coil winding elements 20B' is formed in a second one of the layers "L," and third and fourth sets of coil winding elements 20C' and 20D' (see FIG. 12) are formed in the intermediate layers that lie between the coil winding elements 20A' and 20B'. A pair of contact pads 22' and 24' are provided for connecting the write coil 20' to an information-modulated current source (not shown). The write elements 12' further comprise a pair of pole tips 26' and 28' that provide the write gap 14' at the write module tape bearing surface 10'. A pair of pole pieces 30' and 32' respectively extend from the pole tips 26' and 28' to a back gap region 34' where the pole pieces are joined. The pole tips 26'/28' and the pole pieces 30' and 32' can be formed from any suitable magnetically permeable material of the type conventionally used to fabricate inductive write heads for information storage. As can be seen in FIG. 13, the pole pieces 30' and 32' initially extend from the pole tips 26' and 28' in a direction that is generally perpendicular to the write module tape bearing surface 10'. Each pole piece 30' and 32' then makes an approximate 90° bend at a separate one of the layers "L" of the write module 4', and thereafter extends generally parallel to the write module tape bearing surface 10' to the back gap region 34'. The back gap region 34' is thereby spaced in a trackwise direction from the write gap 14'.

It will be seen in FIG. 13 that the write coil 20' wraps around the pole piece 32'. When the write coil 20' is energized, it will induce magnetic flux in the pole pieces 30' and 32' so as to produce a magnetic field at the pole tips 26' and 28' that propagates across the write gap 14'. It will be appreciated that the strength of the magnetic field at the write gap 14' depends in part on the number of windings of the write coil 20'. The number of winding of the write coil 20' can be increased by increasing the length of the pole pieces 30' and 32'.

Figure 12A:
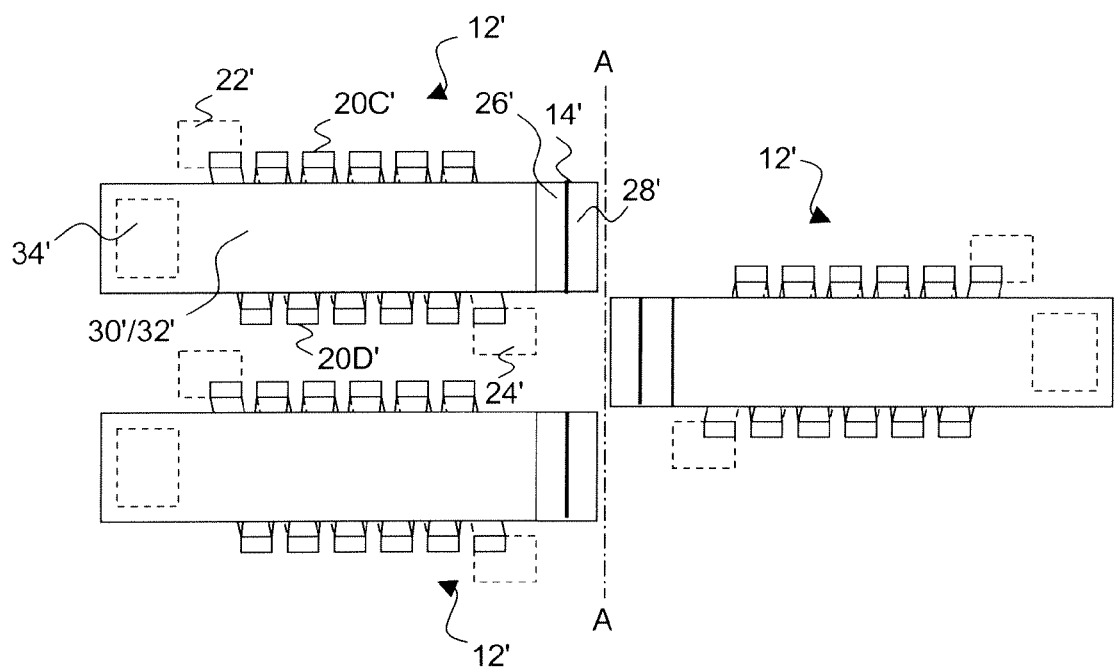
FIG. 12A is an enlarged plan view showing a modified arrangement of write elements of the write module shown in FIG. 12.

As best shown in FIGS. 11 and 12, the write elements 12' are arranged so that adjacent write elements have adjacent pole tips 26'/28' but oppositely extending pole pieces 30'/32' and back gaps 34'. It will also be seen that the write elements 12' are arranged so that the write gaps 14' of adjacent write elements are generally aligned along an axis "A-A" that is perpendicular to a streaming direction of the magnetic recording tape (shown by the arrow "D" in FIG. 11). For processing expediency, it may be desirable to slightly stagger the transducing gaps 14' of adjacent write elements 12', as shown in FIG. 12A. However, the write gaps 14' nonetheless remain symmetrically aligned about each side of the common axis "A-A" that is perpendicular to the direction of tape movement. Depending on the size of the write coil 20', the write elements 12' may be arranged with spaced write gaps (not shown) that are spaced by approximately one gap width (i.e., a gap pitch of twice the gap width), or with near contiguous transducing gaps (as shown in FIGS. 11 and 12) having a nominal spacing that is substantially less than one gap width in order to bundle write on contiguous tracks of the magnetic recording medium. As described above in connection with the write elements 12 of FIGS. 4-7, a gap spacing corresponding to the erase band width of the write elements 12' may be used. The gap pitch will then be the sum of the gap width and the erase band width. Assuming a typical gap size of approximately 5 microns, the gap spacing (if equal to the erase band width), would be approximately 15-25 microns (assuming a typical erase band width of approximately 3-5 times the gap size). Note that the helical configuration of the write coil 20' allows the write elements 12' to have a relatively narrow footprint (as compared to the pancake coil configuration described above) that facilitates the near contiguous gap configuration.

Figure 15:
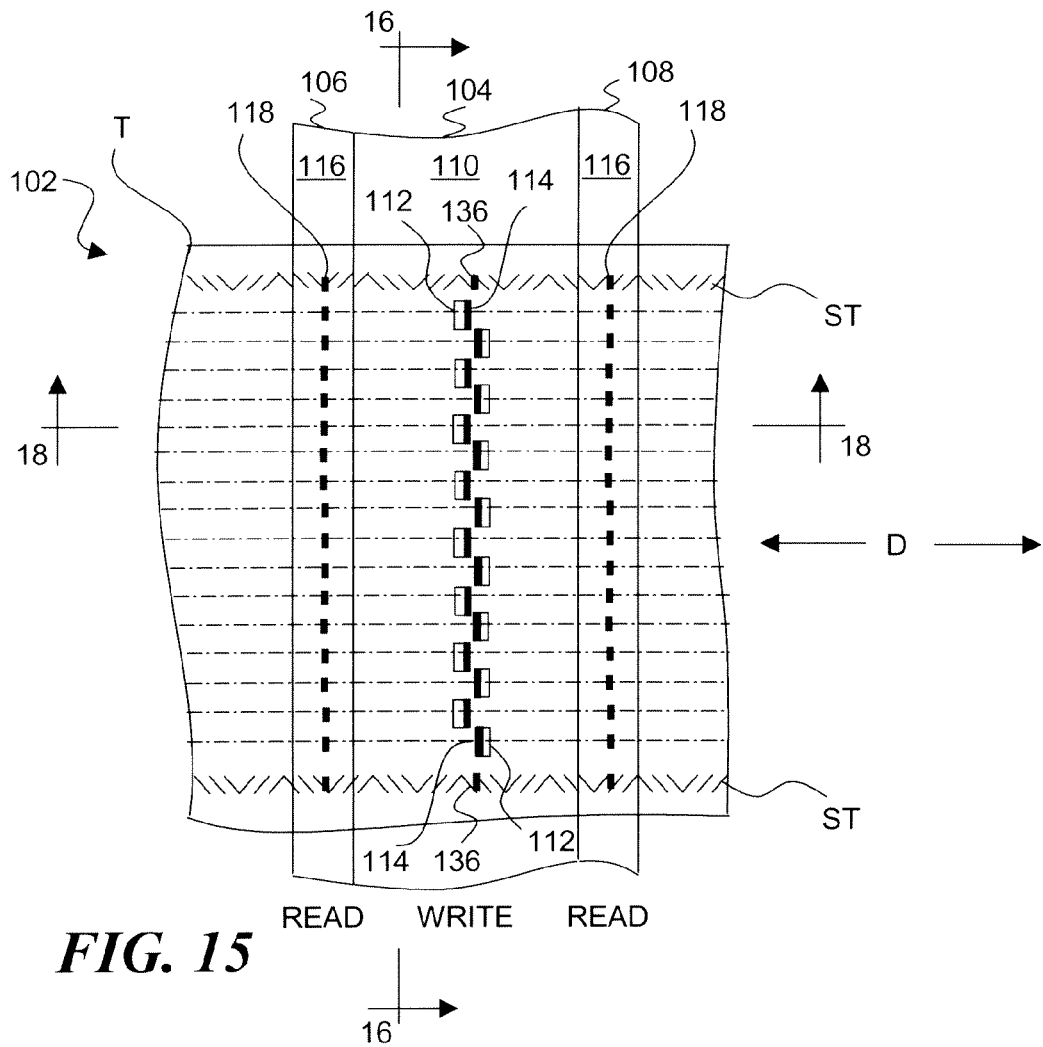
FIG. 15 is a partial plan view showing a tape bearing surface of another exemplary tape head, with a segment of magnetic recording tape superimposed over the tape head.

Turning now to FIG. 15, an alternative tape head 102 is constructed according to an exemplary three-module configuration in which a write module 104 may be used alone or optionally arranged with one or both of a pair of read modules 106 and 108. The write module 104 has a write module tape bearing surface 110 for engaging a magnetic recording tape "T," one edge of which is shown in FIG. 15. As additionally shown in FIGS. 16-18, the write module 104 has a vertical head construction in which plural write elements 112 in the write module 104 each comprise plural thin film layers "L" oriented in generally perpendicular relationship with the write module tape bearing surface 110. It will be seen in FIG. 16A that the write elements 112 are arranged so that the transducing gaps 114 of adjacent write elements are generally aligned along an axis A-A that is perpendicular to a streaming direction of the magnetic recording tape (shown by the arrow "D").

Figure 18:
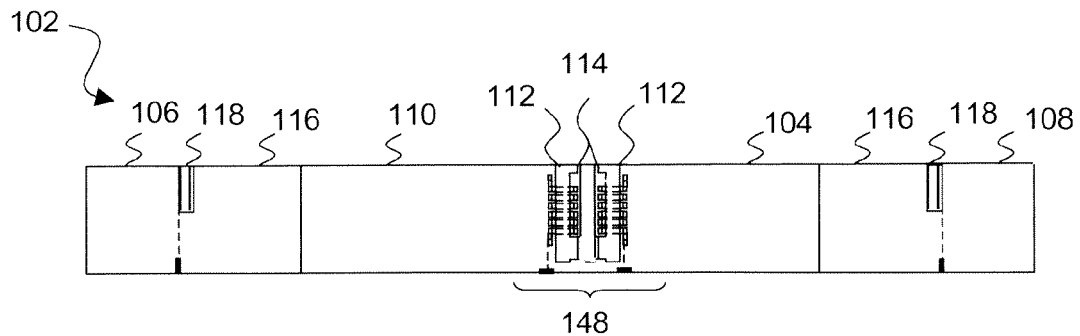
FIG. 18 is a head cross-sectional view taken along line 18-18 in FIG. 15.

Each of the optional read modules 106 and 108 has a read module tape bearing surface 116 for engaging the magnetic recording tape "T." As additionally shown in FIG. 18, the read modules 106 and 108 have a conventional vertical head construction in which the read elements 118 each comprise plural thin film layers oriented in generally perpendicular relationship with the read module tape bearing surface 116. Although not shown, adjacent read elements 118 may be formed in different layers of the read modules 106 and 108 to reduce read gap spacing requirements. Although the read modules 106 and 108 are shown in FIG. 15 as being contiguous with the write module 104, one or both of the read modules could be spaced from the write module in a fixed relationship therewith.

Figure 16:
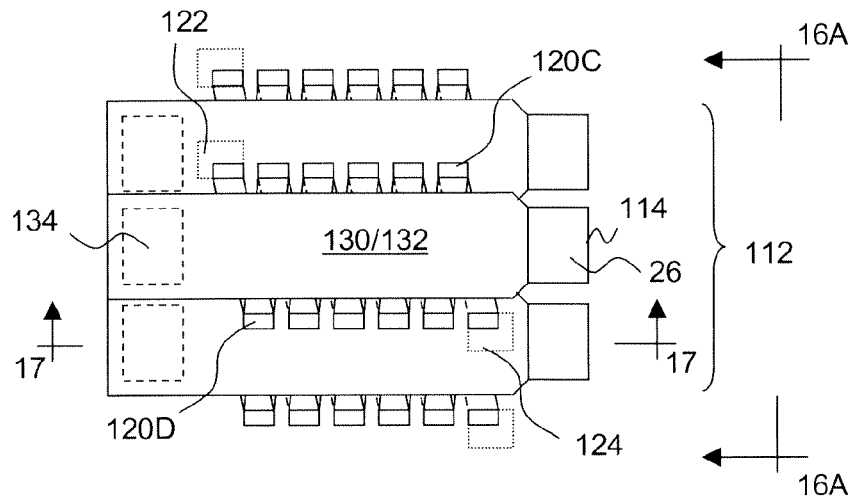
FIG. 16 is an enlarged partial cross-sectional view taken along line 16-16 in FIG. 15 and showing a portion of a write module of the tape head of FIG. 15.
Figure 17:
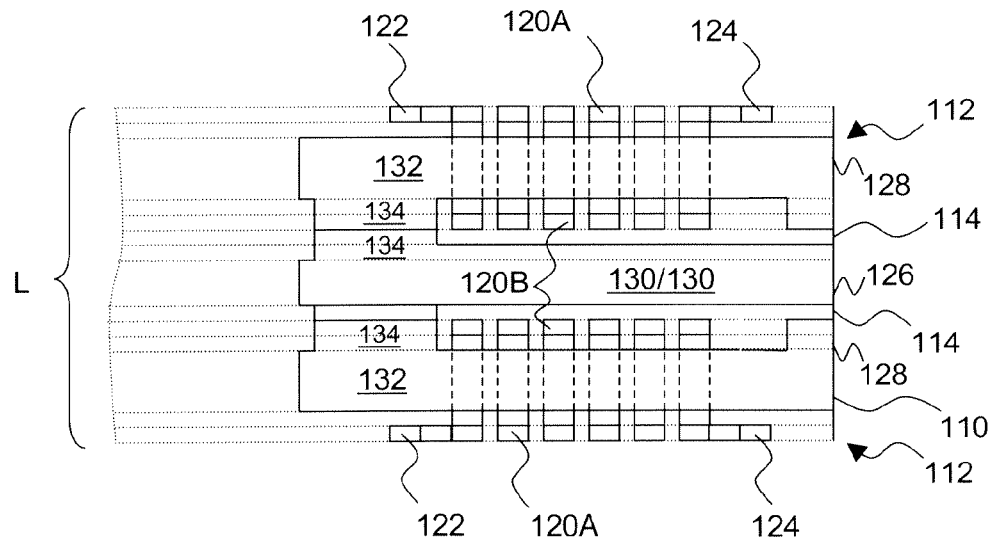
FIG. 17 is write element cross-sectional view taken along line 17-17 in FIG. 16.

As can be seen in FIGS. 16 and 17, the write elements 112 comprise a helical coil construction. According to this construction, the write coil 120 is constructed with plural coil windings in plural film layers "L," as can be seen in FIG. 17. In particular, a first set of coil winding elements 120A is formed in a first one of the layers "L," a second set of coil winding elements 120B is formed in a second one of the layers "L," and third and fourth sets of coil winding elements 120C and 120D (see FIG. 16) are formed in the intermediate layers that lie between the coil winding elements 120A and 120B. A pair of contact pads 122 and 124 are provided for connecting the write coil 120 to an information-modulated current source (not shown). The write elements 112 further comprise a pair of pole tips 126 and 128 that provide the write gap 114 at the write module tape bearing surface 110. A pair of pole pieces 130 and 132 respectively extend from the pole tips 126 and 128 to a back gap region 134 where the pole pieces are joined. The pole tips 126/128 and the pole pieces 130 and 132 can be formed from any suitable magnetically permeable material of the type conventionally used to fabricate inductive write heads for information storage. As can be seen in FIG. 17, the pole pieces 130 and 132 respectively extend from the pole tips 126 and 128 in a direction that is generally perpendicular to the write module tape bearing surface 110 to the back gap region 134.

It will be seen in FIG. 17 that the write coil 120 wraps around the pole piece 132. When the write coil 120 is energized, it will induce magnetic flux in the pole pieces 130 and 132 so as to produce a magnetic field at the pole tips 126 and 128 that propagates across the write gap 114. It will be appreciated that the strength of the magnetic field at the write gap 114 depends in part on the number of windings of the write coil 120. The number of winding of the write coil 120 can be increased by increasing the length of the pole pieces 130 and 132.

Figure 16A:
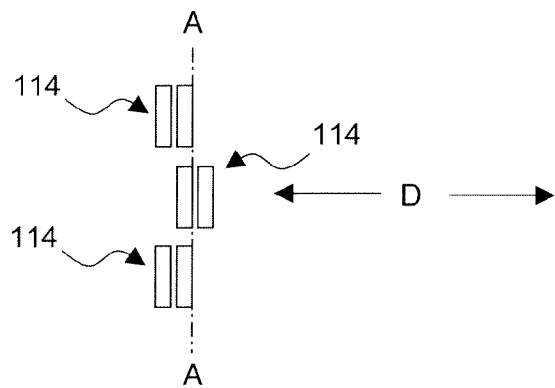
FIG. 16A is a write element cross-sectional view taken along line 16A-16A in FIG. 16.

As additionally shown in FIGS. 16A and 17, the write elements 112 are arranged so that adjacent write elements have adjacent pole tips 114 and with the pole pieces 130 formed in a common one of the layers "L." The pole pieces 132 and the back gaps 134 are formed in alternating layers "L" of the write module 104 to reduce write gap spacing requirements. A variant of this construction would be to form the write elements 112 so that the pole tips 114 of adjacent elements are formed in the same layers "L." This would result in the write gaps of the pole tips 114 being centered on the axis "A" in FIG. 16A. The write elements 112 may thus be arranged with near contiguous write gaps (see FIGS. 16 and 16A) in order to bundle write on contiguous tracks of the magnetic recording medium. For example, a gap spacing corresponding to the erase band width of the write elements 112 may be used. The gap pitch will then be the sum of the gap width and the erase band width. Assuming a typical gap size of approximately 5 microns, the gap spacing (if equal to the erase band width), would be approximately 15-25 microns (assuming a typical erase band width of approximately 3-5 times the gap size). As shown in FIG. 16A, the write elements 112 are arranged so that the write gaps 114 of adjacent write elements are generally aligned along an axis "A-A" that is perpendicular to a streaming direction of the magnetic recording tape (shown by the arrow"D").

As shown in FIG. 15, the tape head 102 includes servo read elements for reading conventional timing-based servo tracks "ST" on the tape "T." The servo read elements may be provided by additional read elements 118 on the read modules 16 and 18 (assuming the read modules are present), or they may be provided by servo read elements 36 on the write module 4.

FIG. 18 shows the tape head 102 when viewed from the edge of the tape "T" of FIG. 15. As can be seen, electrical connections are made to the write elements 114 from electrical contact pads 148 formed on the surface of the tape head 102 which is opposite from the tape bearing surface 110. Electrical cables (not shown) may be attached to the contact pads 148 using conventional techniques. Electrical connections to the reader elements 118 can be provided using conventional contact pads of the type shown in FIG. 1, as are commonly used for vertical read elements. Although not shown, it would be possible to fabricate driver components, such as FETs (Field Effect Transistors), above the contact pads 148 of the write and read modules 14, 16 and 18. Alternatively, the drivers may be fabricated on separate chips, which are then mounted close to the tape head 12. As further shown in FIG. 18, the tape bearing surfaces 110 and 116 of the tape head 102 may be lapped to define a preferred tape wrap angle as the tape "T" streams over the head.

Figure 19:
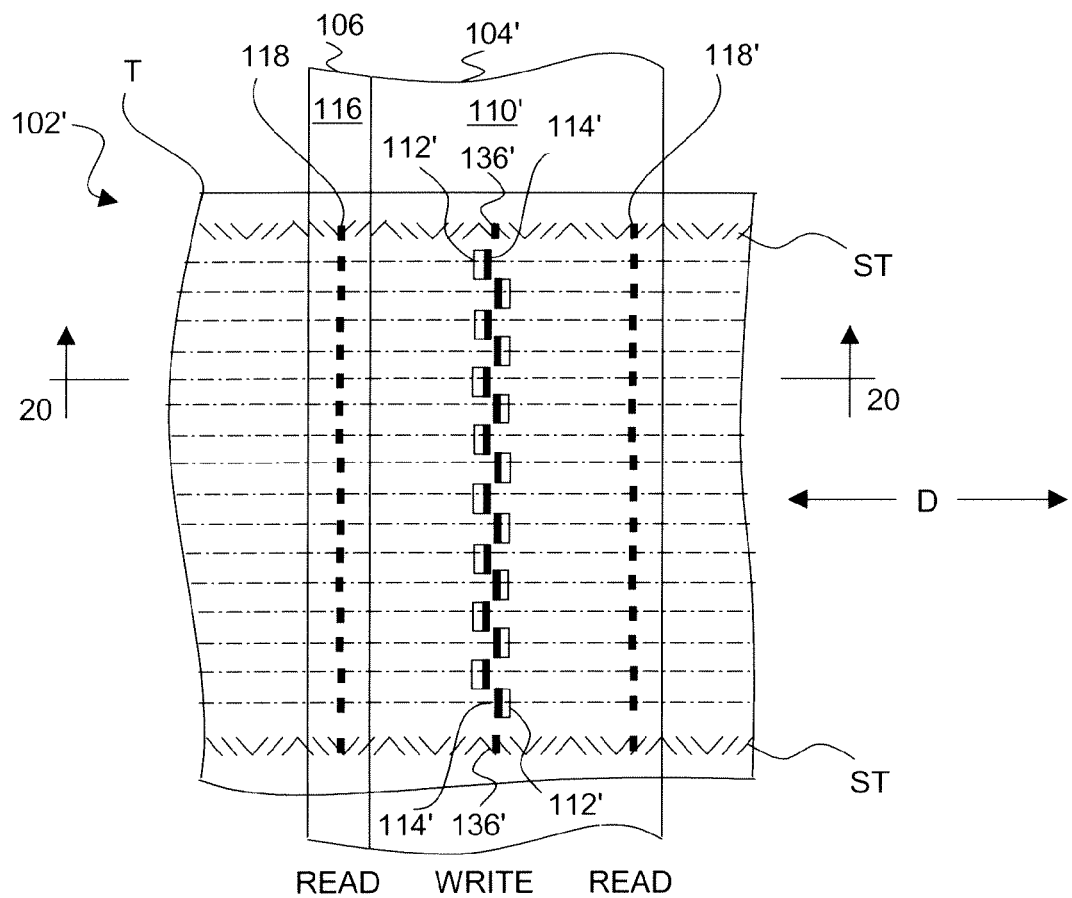
FIG. 19 is a partial plan view showing a tape bearing surface of another exemplary tape head, with a segment of magnetic recording tape superimposed over the tape head.
Figure 20:
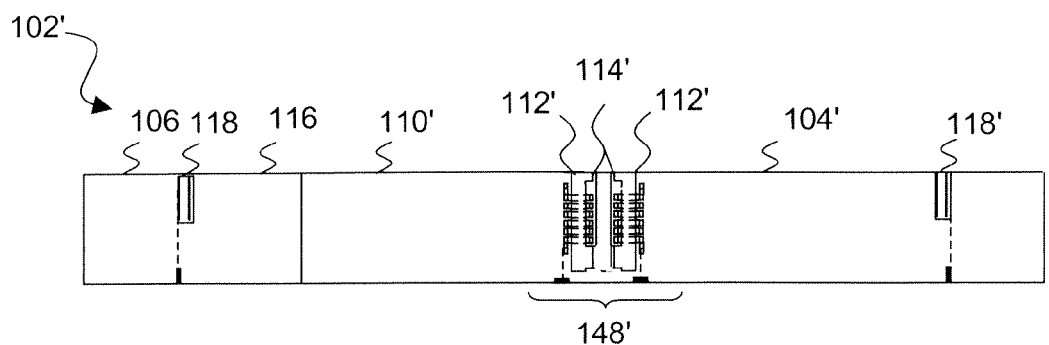
FIG. 20 is a head cross-sectional view taken along line 20-20 in FIG. 19.

Turning now to FIGS. 19 and 20, a modified tape head 102' is shown that is identical in all respects to the tape head 102 with the exception that the read module 108 is eliminated. Instead, there is only one read module 106 containing a first array of read elements 118, and a write module 110' having an array of vertical write elements 112' and an integrated array of vertical read elements 118'. Although not shown, an EMI shielding layer is preferably formed in the write module 110' between the write element array and the read element array in order to prevent cross-talk between the write elements 112' and the read elements 118'.

Figure 21:
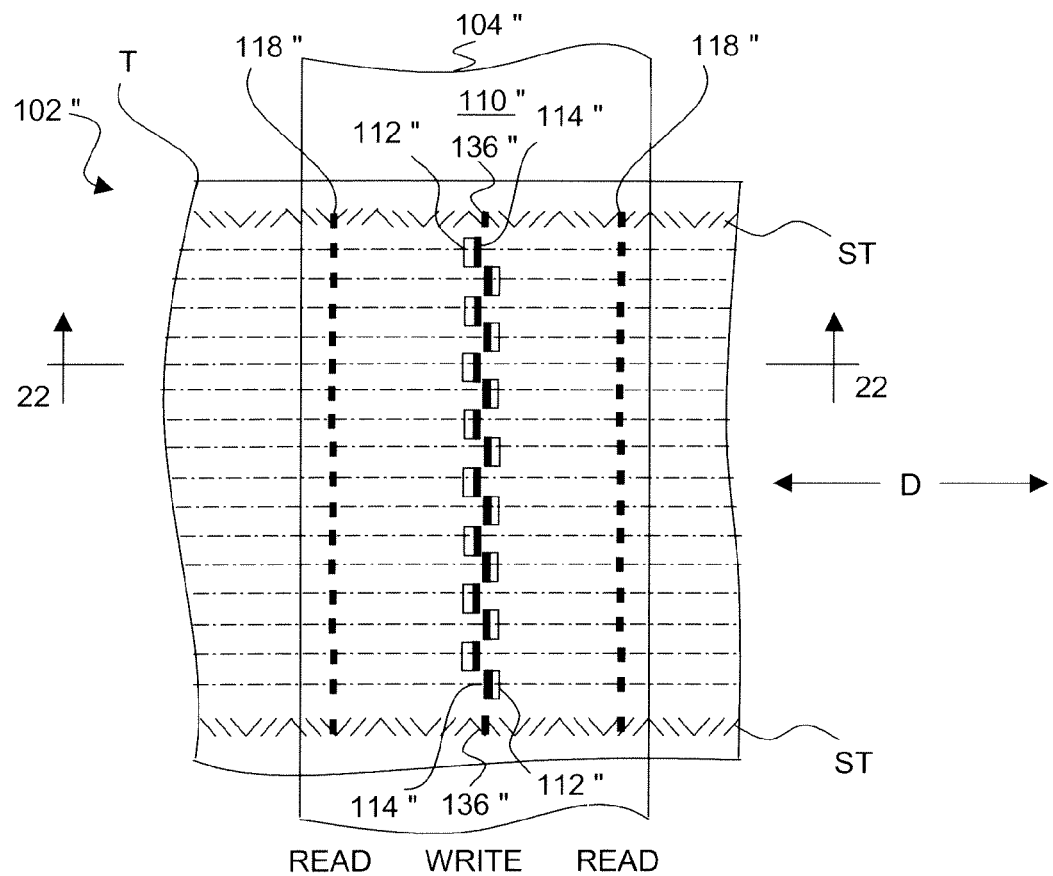
FIG. 21 is a partial plan view showing a tape bearing surface of a tape head constructed in accordance with another exemplary embodiment of the present invention, with a segment of magnetic recording tape superimposed over the tape head.
Figure 22:
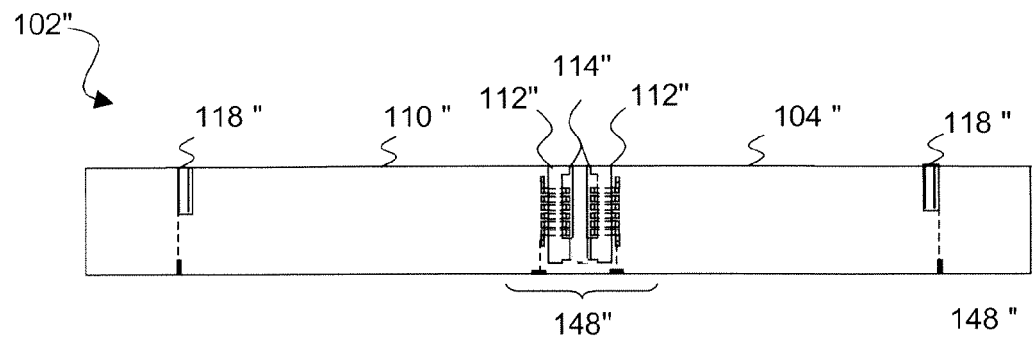
FIG. 22 is a head cross-sectional view taken along line 22-22 in FIG. 21.

Turning now to FIGS. 21 and 22, a second modified tape head 102" is shown that is identical in all respects to the tape head 102 with the exception that the read modules 106 and 108 are eliminated. Instead, a write module 110" has a two integrated arrays of vertical read elements 118" that sandwich the array of vertical write elements 112". Although not shown, EMI shielding layers are preferably formed in the write module 110" between the write elements array and the read element arrays in order to prevent cross-talk between the write elements 112" and the read elements 118".

Figure 23:
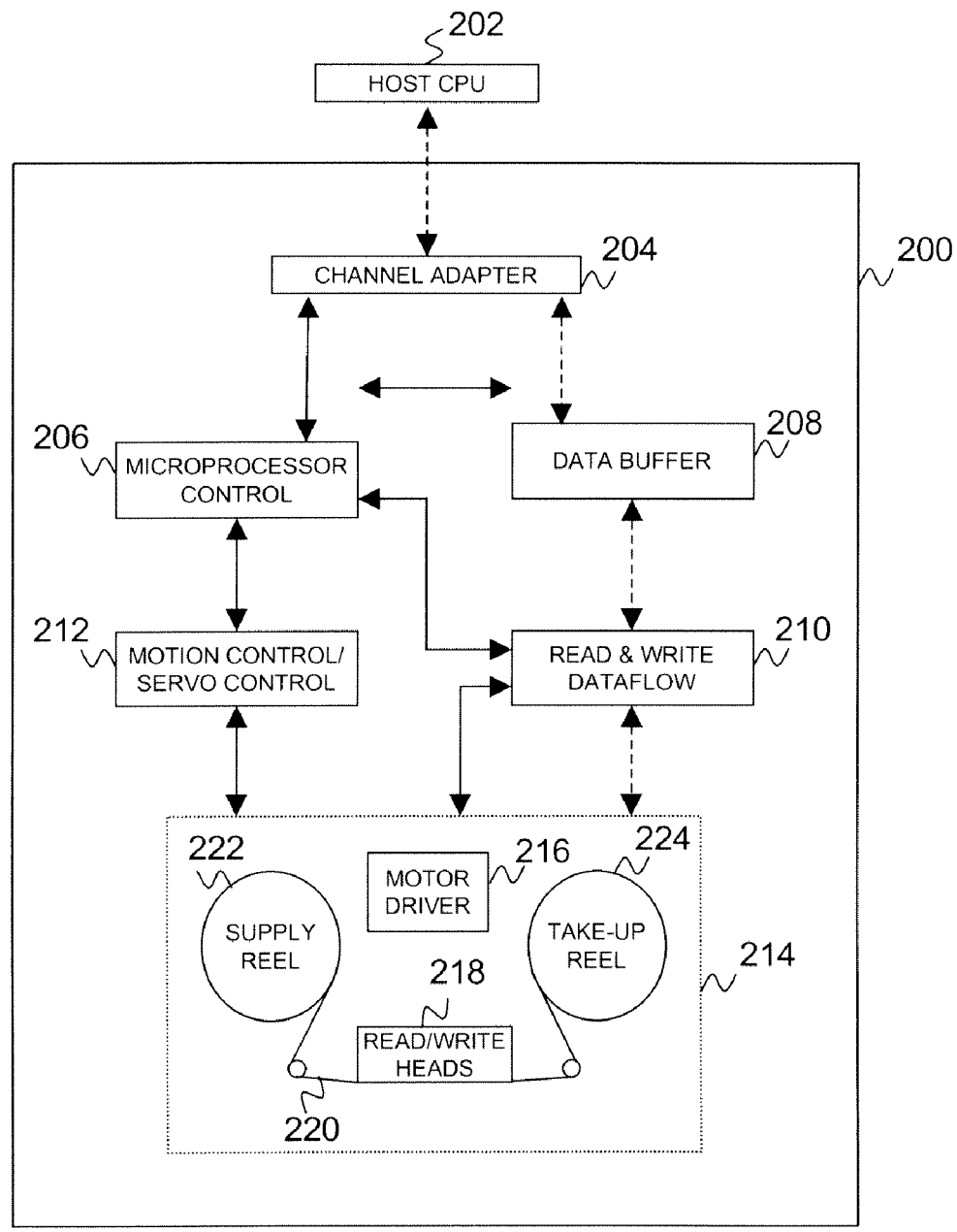
FIG. 23 is a functional block diagram showing a tape drive data storage device.

Turning to FIG. 23, the inventive concepts herein described may be embodied in a tape drive data storage device (tape drive) 200 for storing and retrieving data by a host data processing device 202, which could be a general purpose computer of other processing apparatus adapted for data exchange with the tape drive 200. The tape drive 200 includes plural components providing a control and data transfer system for reading and writing host data on a magnetic tape medium. By way of example only, those components may conventionally include a channel adapter 204, a microprocessor controller 206, a data buffer 208, a read/write data flow circuit 210, a motion control system 212, and a tape interface system 214 that includes a motor driver circuit 216 and a read/write head unit 218.

The microprocessor controller 206 provides overhead control functionality for the operations of the tape drive 200. As is conventional, the functions performed by the microprocessor controller 206 are programmable via microcode routines (not shown) according to desired tape drive operational characteristics. During data write operations (with all dataflow being reversed for data read operations), the microprocessor controller 206 activates the channel adapter 204 to perform the required host interface protocol for receiving an information data block. The channel adapter 204 communicates the data block to the data buffer 208 that stores the data for subsequent read/write processing. The data buffer 208 in turn communicates the data block received from the channel adapter 204 to the read/write dataflow circuitry 210, which formats the device data into physically formatted data that may be recorded on a magnetic tape medium. The read/write dataflow circuitry 210 is responsible for executing read/write data transfer operations under the control of the microprocessor controller 206. Formatted physical data from the read/write data flow circuitry 210 is communicated to the tape interface system 214. The latter includes one or more read/write heads in the read/write head unit 218, and drive motor components (not shown) for performing forward and reverse movement of a tape medium 220 mounted on a supply reel 222 and a take-up reel 224. The drive components of the tape interface system 214 are controlled by the motion control system 212 and the motor driver circuit 216 to execute such tape movements as forward and reverse recording and playback, rewind and other tape motion functions. In addition, in multi-track tape drive systems, the motion control system 212 transversely positions the read/write heads relative to the direction of longitudinal tape movement in order to record data in a plurality of tracks.

Figure 24:
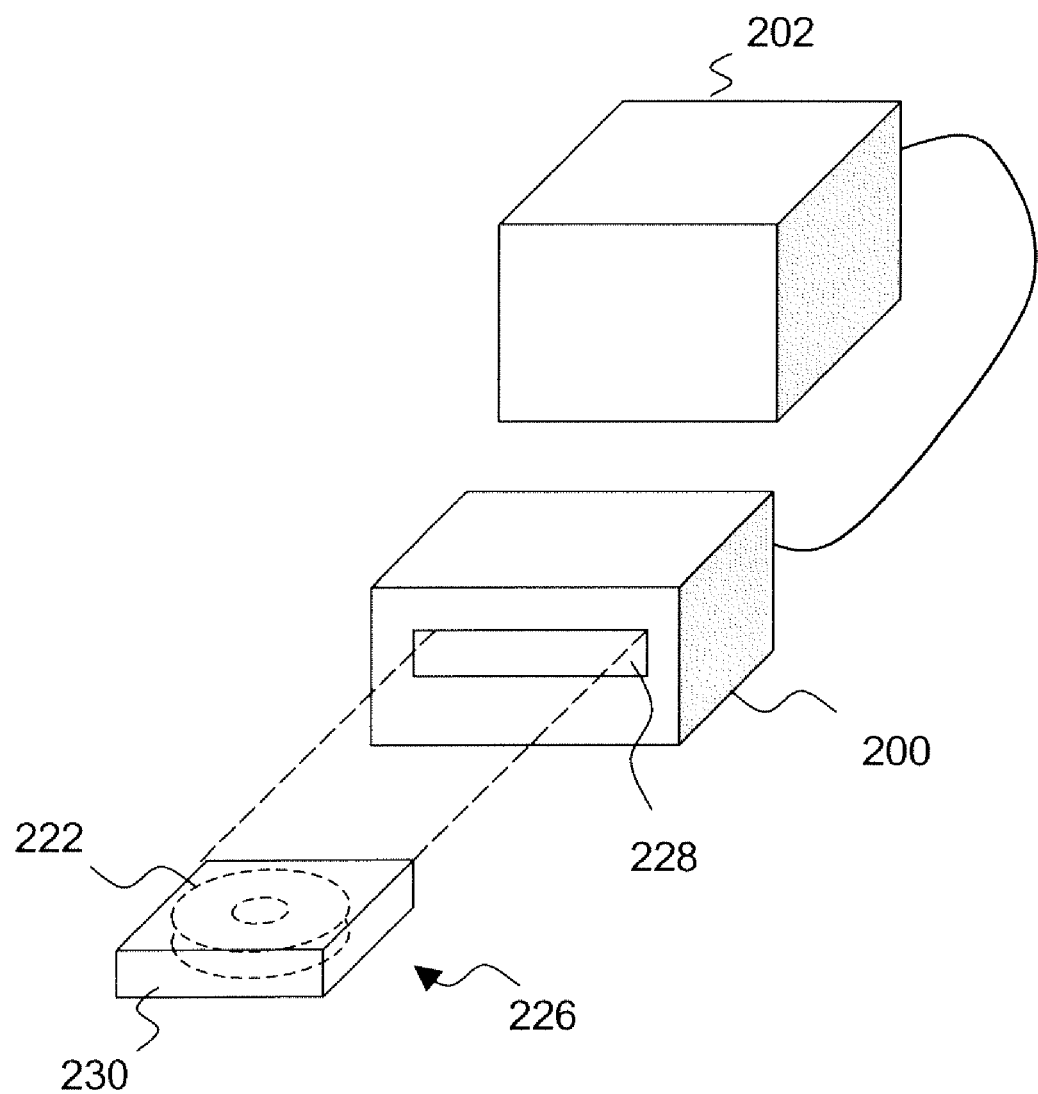
FIG. 24 is a perspective view showing an exemplary construction of the tape drive storage device of FIG. 20 for use with cartridge-based tape media.

In most cases, as shown in FIG. 24, the tape medium 220 will be mounted in a cartridge 226 that is inserted in the tape drive 200 via a slot 228. The tape cartridge 226 comprises a housing 230 containing the magnetic tape 220. The supply reel 222 is shown to be mounted in the housing 230.

Accordingly, a low track pitch write head and bidirectional tape head for writing and/or reading data on a magnetic recording tape has been disclosed. While various embodiments of the invention have been shown and described, it should be apparent that many variations and alternative embodiments could be implemented in accordance with the teachings herein. It is understood, therefore, that the invention is not to be in any way limited except in accordance with the spirit of the appended claims and their equivalents.

What is claimed is:

1. A write module for writing data on a magnetic recording tape, comprising:

a tape bearing surface for engaging said magnetic recording tape;

plural write elements, each of which comprises:

a first pole piece;

a second pole piece;

said first and second pole pieces having respective pole tips separated from each other at said tape bearing surface to form a write gap having a write gap length that represents a separation distance between said respective pole tips, and said pole tips also having a width dimension defining a write gap width;

said first and second pole pieces further having respective back gap regions that are magnetically connected to each other;

said write elements being constructed and arranged so that the write gaps of adjacent write elements are in a near contiguous relationship in which said write gaps are spaced from each other by not more than approximately 3-5 times said write gap length; and said write gaps being generally aligned along an axis that is perpendicular to a direction of movement of said magnetic recording tape;

wherein said write elements have a planar construction comprising plural thin film layers oriented in generally parallel relationship with said tape bearing surface, and are arranged so that adjacent write elements have adjacent pole tips but oppositely extending pole pieces and back gap regions.

2. A write module in accordance with claim 1 wherein said write elements comprise a pancake pole construction in which a pancake pole coil wraps around one of said pole pieces.

3. A write module in accordance with claim 1 wherein said write elements comprise a helical construction in which a helical coil wraps around one of said pole pieces.

4. A write module in accordance with claim 1 in combination one or more read modules each comprising an array of read elements, said read module(s) being mounted in a fixed relationship relative to said write module.

5. A write module in accordance with claim 1 in combination with one or more arrays of read elements formed on a common substrate with said write elements.

6. In a tape drive, a tape head for writing data on a magnetic recording tape, comprising:

a write module;

a write module tape bearing surface for engaging said magnetic recording tape;

plural write elements in said write module, each of which comprises:

a first pole piece;

a second pole piece;

said first and second pole pieces having respective pole tips separated from each other at said write module tape bearing surface to form a write gap having a write gap length that represents a spacing distance between said respective pole tips, and said pole tips also having a width dimension defining a write gap width;

said first and second pole pieces further having respective back gap regions that are magnetically connected to each other;

said write elements being constructed and arranged so that the write gaps of adjacent write elements are in a near contiguous relationship in which said write gaps are spaced from each other by not more than approximately 3-5 times said gap length to facilitate contiguous track bundle writing;

said write gaps being generally aligned along an axis that is perpendicular to a direction of movement of said magnetic recording tape; and said write elements having a planar construction comprising plural thin film layers oriented in generally parallel relationship with said write module tape bearing surface; wherein said write elements are arranged so that adjacent write elements have adjacent pole tips but oppositely extending pole pieces and back gap regions.

7. A tape drive in accordance with claim 6 wherein said write elements comprise a pancake coil construction in which a pancake coil wraps around one of said pole pieces.

8. A tape drive in accordance with claim 6 wherein said write elements comprise a helical construction in which a helical coil wraps around one of said pole pieces.

9. A tape drive in accordance with claim 6 further comprising one or more read modules.

* * * * *